United States Patent [19]

Thompson et al.

[11] Patent Number: 5,397,587
[45] Date of Patent: Mar. 14, 1995

[54] MOIST PASTA-TYPE FOOD PRODUCTS AND METHOD OF PRODUCING SAME

[75] Inventors: Richard Thompson, Ft. Lauderdale, Fla.; Gordon R. Huber; Gerry M. Hertzel, both of Sabetha, Kans.; Herbert R. Heinicke, Indianola, Iowa; William T. Pelletier, Lincolnshire, Ill.

[73] Assignee: Thompson's Pet Pasta Products, Inc., Kansas City, Kans.

[21] Appl. No.: 103,429

[22] Filed: Aug. 6, 1993

[51] Int. Cl.$^6$ .......................... A23L 1/16; A23K 1/00
[52] U.S. Cl. ........................... 426/557; 426/331; 426/451; 426/635; 426/805
[58] Field of Search ................ 426/549, 557, 451, 635, 426/805, 331

[56] References Cited

U.S. PATENT DOCUMENTS

| | | |
|---|---|---|
| 1,299,819 | 4/1919 | Bouchet . |
| 1,883,653 | 10/1932 | Epstein et al. . |
| 2,243,690 | 5/1941 | Walting . |
| 2,677,613 | 5/1954 | Shiah . |
| 3,138,462 | 6/1964 | Katz et al. . |
| 3,192,049 | 6/1965 | Kinsley . |
| 3,252,805 | 5/1966 | Sienkiewicz et al. . |
| 3,482,993 | 12/1969 | Finucane . |
| 3,495,989 | 2/1970 | Lewis et al. . |
| 3,537,862 | 11/1970 | Peters et al. . |
| 3,615,677 | 10/1971 | Scharschmidt et al. . |
| 3,655,401 | 4/1972 | Halik . |
| 3,655,404 | 4/1972 | Glasser . |
| 3,732,112 | 5/1973 | Frankenfeld et al. . |
| 3,753,734 | 8/1973 | Kaplow et al. . |
| 3,767,421 | 10/1973 | Gulstad et al. . |
| 3,767,422 | 10/1973 | Levitz . |
| 3,769,034 | 10/1973 | Dreier et al. . |
| 3,846,563 | 11/1974 | Cunningham . |
| 3,914,445 | 10/1975 | Pavey . |
| 3,916,029 | 10/1975 | Hildebolt . |
| 4,044,165 | 8/1977 | Baumann . |
| 4,098,906 | 7/1978 | Hisaki et al. . |
| 4,162,336 | 7/1979 | Brown, Jr. et al. ............... 426/805 |
| 4,212,894 | 7/1980 | Franzen et al. . |
| 4,225,630 | 9/1980 | Pitchon ............................ 426/805 |
| 4,234,617 | 11/1980 | Sakakibara et al. . |
| 4,243,689 | 1/1981 | Kokeguchi et al. . |
| 4,243,690 | 6/1981 | Murakami et al. . |
| 4,297,378 | 10/1981 | Haasi et al. . |
| 4,368,210 | 1/1983 | Murakami et al. . |
| 4,511,585 | 4/1985 | Durst . |
| 4,529,609 | 7/1985 | Gaehring et al. . |
| 4,582,711 | 4/1986 | Durst . |
| 4,781,938 | 11/1988 | Pflaumer et al. . |
| 4,857,346 | 8/1989 | Sato et al. . |
| 4,965,082 | 10/1990 | Chawan et al. . |
| 4,997,671 | 3/1991 | Spanier . |
| 5,004,624 | 4/1991 | Koschak et al. . |
| 5,059,433 | 10/1991 | Lee et al. . |
| 5,059,439 | 10/1991 | Wenger et al. . |

Primary Examiner—Donald E. Czaja
Assistant Examiner—Mary S. Mims
Attorney, Agent, or Firm—Hovey, Williams, Timmons & Collins

[57] ABSTRACT

Highly palatable, shelf-stable, moist, pasta-type extruded food products are provided which can be formulated as a human food (e.g., a confection) or as a pet food. The extruded products of the invention include a substantially completely gelatinized matrix including therein from about 35–70% by weight starch, dry basis, together with quantities of protein and sugar. The extruded products should have a moisture content of from about 15–30% by weight, and a water activity of from about 0.6–0.9. The products are made by forming a mixture of ingredients followed by preconditioning, extrusion and drying and/or cooling to achieve the final desired moisture.

39 Claims, No Drawings

MOIST PASTA-TYPE FOOD PRODUCTS AND METHOD OF PRODUCING SAME

BACKGROUND OF THE INVENTION

1. Field of the Invention

The present invention is broadly concerned with soft, moist pasta-type foods, and an extrusion method of producing the same, which can be formulated as a confection for human consumption, or as a pet food. More particularly, the invention pertains to shelf-stable pasta-type foods in the form of extruded bodies having a substantially completely gelatinized matrix (in practice the matrix is entirely gelatinized) including from about 35–70% by weight starch together with respective quantities of protein and sugar; the extruded feed has a moisture content of from about 15–30% by weight and a water activity of from about 0.6–0.9, in order to yield a soft, resilient product resembling conventional pasta.

2. Description of the Prior Art

Traditional pasta products are normally packaged and sold in a dried condition, necessitating rehydration and/or cooking before consumption. These products are simply not considered properly edible without such preliminary treatment. U.S. Pat. No. 5,059,439 describes an extrusion process for the production of instant or quick cooking pastas eminently suited for human consumption; nevertheless, pastas produced in accordance with this patent are normally dried to moisture contents on the order of 10–12% by weight. There has heretofore been no truly successful process for the production of soft, moist, pasta-type products which can be directly eaten without the necessity for rehydration or cooking, even though the nutritional, organoleptic and convenience advantages of such products are significant.

Dry and semi-dry pet foods are also conventionally produced using extrusion cooking technology. Generally, a starting mixture comprising ingredients such as soy and wheat flours, farinaceous products and meat and bone meal, is moisturized and fed through an extruder for more or less complete cooking of the ingredients and shaping thereof into a desired final form such as a kibble or chunk. In many cases, such extruded feeds may be fed alone, but it is also common to mix canned feed with the dry, extruded products to form a complete diet.

The nutritional benefits to humans of pasta products are well known, which in part accounts for the tremendous consumption of these foods. However, attempts to commercially prepare pasta-type pet food products have generally not been successful.

SUMMARY OF THE INVENTION

The present invention is predicated upon the discovery that pasta-type food products can be provided which have very desirable softness, edibility and moisture contents, rendering them suitable for direct consumption. Such products in accordance with the invention can be formulated either for human or animal consumption, e.g., as a sweetened confection or as a pet food designed to be fed alone or in combination with a kibble feed.

Broadly speaking, soft, moist pasta-type food products in accordance with the invention comprise bodies having an extruded, substantially completely gelatinized defining matrix including therein from about 35–70% by weight starch on a dry basis, together with respective quantities of protein and sugar. The sugar content can be derived from any naturally occurring sugar such as sucrose or fructose. The extruded bodies should have a moisture content of from about 15–30% by weight and a water activity of from about 0.6–0.9. The bodies are moreover manually deformable and have the property of resiliently returning to their original shape after such deformation. Finally, the bodies should have a bacteriological shelf stability of at least about nine months.

In preferred forms, the pasta-type food products of the invention can be extruded in a variety of shapes, such as tubular, helically twisted or string-like shapes. Furthermore, the defining matrix of the products preferably includes materials such as wheat flour, Semolina, cereal grain flours (e.g., rice, corn and oat), starches from any source, surfactant(s) and glycerine; advantageously, this matrix includes at least about 65% by weight wheat flour on a dry basis, in order to enhance the palatability of the products. The preferred water activity of the pasta-type foods should be from about 0.7–0.85, with the moisture content being from about 18–23% by weight. The products of the invention typically contain up to about 35% by weight sugar and up to about 25% by weight protein, both on a dry basis. However, the levels of use of these components are variable, depending upon the type of product desired. For example, in the case of a confection product, the levels of sugar would be relatively high, and typically on the order of about 18–25% by weight, dry basis; protein use in such confections would normally be from about 1–10% by weight, dry basis. In contrast, where a pet food is contemplated, the sugar levels would usually be lower, say from about 3–10% by weight, dry basis, whereas the protein content would be from about 4–10% by weight, dry basis, where the pasta-type pet food is to be mixed with a conventional kibble, or up to about 25% by weight protein, dry basis, where the pasta-type pet food is to be fed alone.

Where a pet food is being produced, the pH of the pasta-type feed would generally be in the range of from about 4.9–5.5. Furthermore, such pet products would typically be formulated in conjunction with a kibble or other variety of farinaceous-based pet food, so that the entire combined feed is nutritionally complete. Typically, important nutritional ingredients such as vitamins, trace minerals and calcium and phosphorus sources can more readily be added to farinaceous feeds, rather than the pasta-type products of the present invention. Additionally, emulsified meats can be added to the pet food formulas if desired, at levels of up to about 15% by weight.

The preferred method of producing the pasta-type food products of the invention involves the steps of first forming a mixture including therein from about 35–70% by weight starch on a dry basis, with respective quantities of protein and sugar. The starch content is normally provided as a fraction of wheat or other flour used in the formulation. Water is next added to the mixture and the latter is passed through an extruder presenting an elongated barrel having an axially rotatable auger with an endmost extrusion die. During passage through the extruder the moisturized mixture is subjected to increasing levels of temperature, pressure and shear in order to substantially completely gelatinize the starch fraction of the moisturized mixture and to form a body having the requisite moisture content of from about 15–30% by weight, and water activity from about 0.6–0.9.

Preferably, the initial moisturizing involves first passing the dry mixture through a preconditioning device wherein steam and/or water are added to the dry ingredients and the mixture is subjected to mixing. The moisturized mixture should be subjected to a maximum temperature of from about 100° to 212° F., and more preferably from about 190° to 210° F., in the preconditioner. The residence time of the ingredients in the preconditioner should moreover be from about 0.5 to 6 minutes, and more preferably from about 1.5 to 2.5 minutes. The moisture content of the mixture leaving the preconditioner should be from about 15 to 38% by weight and more preferably from about 23 to 30% by weight, moisture content wet basis (MCWB).

After preconditioning, the moisturized mixture is passed into and through the extruder and is subjected therein to maximum temperature in the range of from about 160° to 280° F., and more preferably from about 110° to 130° F. In addition, the moisturized mixture is subjected to maximum pressure during passage through the extruder in the range of from about 300 to 2000 psi, and more preferably from about 750 to 1200 psi. If desired, additional moisture may be added to the mixture in the form of water and/or steam, as the mixture is processed in the extruder barrel. Typically, the moisture content of the product as it emerges from the extruder is in the range of from about 16 to 38% by weight, and more preferably from about 22 to 27% by weight, MCWB.

In the most preferred processing technique, gaseous products and moisture are vented from the mixture during passage thereof along the length of the extruder barrel. This may advantageously be accomplished by subjecting the material to a vacuum (e.g., 5–20 in. Hg) midway between the ends of the extruder barrel. Furthermore, the extruder is operated so as to present a cooking zone, followed by a venting zone, and finally a forming zone leading to the final extrusion die. This configuration is very similar to that disclosed in U.S. Pat. No. 5,059,439, which is incorporated by reference herein. The effect of this configuration is to subject the moisturized mixture to the maximum temperature it will experience in the extruder just prior to the venting step, with a gradual decrease in temperature in the forming zone downstream of the vent.

The overall residence time of the moisturized mixture in the extruder is typically in the range of from about 0.5 to 2.5 minutes, and more preferably from about 0.75 to 1.5 minutes. In terms of the preferred cooking/venting/forming zone extruder configuration, the residence time in the cooking zone should be from about 0.15 to 1.25 minutes, more preferably from about 0.25 to 3 minutes; and in the forming zone from about 0.15 to 2 minutes, and more preferably from about 0.5 to 1 minutes. As the formed product emerges from the extruder, it would typically be cut to a convenient length using any conventional knife mechanism. Thereafter, the product would be dried and/or cooled to achieve the final desired moisture level.

DETAILED DESCRIPTION OF PREFERRED EMBODIMENTS

As indicated above, the preferred extrusion apparatus useful for producing the pasta-type food products of the invention includes a preconditioner serially coupled with an extruder. The preconditioner is preferably of the type described in U.S. Pat. No. 4,752,139 whereas the extruder is advantageously a Wenger TX series twin screw extruder as depicted in U.S. Pat. No. 4,875,847. Both of the aforementioned patents are incorporated by reference herein.

The following examples describe the production of representative pasta-type food products in accordance with the invention. It is to be understood that these examples are presented by way of illustration only, and nothing therein should be taken as a limitation upon the overall scope of the invention.

EXAMPLE 1

A series of dry, pasta-type formulas was prepared, moisturized and extruded in order to yield pet food products in accordance with the invention. These dry formulae are set forth below:

TABLE 1

| Ingredient | Pounds | % By Weight |
|---|---|---|
| FORMULA NO. 1 | | |
| Wisdom Wheat Flour | 37.62 | 37.72 |
| Excello X-Fancy Durum | 37.62 | 37.72 |
| Corn Gluten Meal | 15.00 | 15.04 |
| Dried Egg | 2.50 | 2.51 |
| Blood Plasma | 2.50 | 2.51 |
| Dicalcium Phosphate | 1.50 | 1.50 |
| Limestone | 1.50 | 1.50 |
| Myvaplex Surfactant | 0.75 | 0.75 |
| Salt | 0.50 | 0.50 |
| Potassium Chloride | 0.25 | 0.25 |
| FORMULA NO. 2 | | |
| Formula No. 1 | 50.00 | 83.33 |
| Emulsified Chicken or Beef | 10.00 | 16.67 |
| FORMULA NO. 3 | | |
| Wisdom Wheat Flour | 30.10 | 30.10 |
| Excello X-Fancy Durum | 30.00 | 30.00 |
| Emulsified Chicken | 15.00 | 15.00 |
| Corn Gluten Meal | 15.00 | 15.00 |
| Dried Whole Egg | 2.50 | 2.50 |
| Blood Plasma | 2.50 | 2.50 |
| Dicalcium Phosphate | 1.50 | 1.50 |
| Ground Limestone | 1.50 | 1.50 |
| Morton's Lite Salt | 0.50 | 0.50 |
| Regular Salt | 0.25 | 0.25 |
| Lysine | 0.20 | 0.20 |
| DL Methionine | 0.10 | 0.10 |
| Choline Chloride | 0.10 | 0.10 |
| Myvaplex Surfactant | 0.75 | 0.75 |
| FORMULA NO. 4 | | |
| Wisdom Wheat Flour | 30.10 | 30.10 |
| Excello X-Fancy Durum | 30.00 | 30.00 |
| Beef | 15.00 | 15.00 |
| Corn Gluten Meal | 15.00 | 15.00 |
| Dried Whole Egg | 2.50 | 2.50 |
| Blood Plasma | 2.50 | 2.50 |
| Dicalcium Phosphate | 1.50 | 1.50 |
| Ground Limestone | 1.50 | 1.50 |
| Morton's Lite Salt | 0.50 | 0.50 |
| Regular Salt | 0.25 | 0.25 |
| Lysine | 0.20 | 0.20 |
| DL Methionine | 0.10 | 0.10 |
| Choline Chloride | 0.10 | 0.10 |
| Myvaplex Surfactant | 0.75 | 0.75 |
| FORMULA NO. 5 | | |
| Second Clear Wheat Flour | 74.00 | 82.59 |
| Food Grade Glycerin | 4.20 | 4.69 |
| Baker's Sugar | 5.00 | 5.58 |
| Food Grade Phosphoric Acid | 0.80 | 0.89 |
| Salt | 0.30 | 0.33 |
| Potassium Sorbate | 0.30 | 0.33 |
| Beef Tallow[1] | 3.80 | 4.24 |
| Cheese Powder[1] | 1.20 | 1.34 |
| FORMULA NO. 6 | | |
| Second Clear Wheat Flour | 74.00 | 74.00 |
| Semolina | 5.00 | 5.00 |
| Vital Wheat Gluten | 2.50 | 2.50 |
| Myvaplex Surfactant | 0.50 | 0.50 |
| Food Grade Propylene Glycol | 4.20 | 4.20 |
| Baker's Sugar | 5.00 | 5.00 |

TABLE 1-continued

| Ingredient | Pounds | % By Weight |
|---|---|---|
| Food Grade Phosphoric Acid | 0.80 | 0.80 |
| Salt | 0.30 | 0.30 |
| Morton's Lite Salt | 2.40 | 2.40 |
| Potassium Sorbate | 0.30 | 0.30 |
| Beef Tallow[1] | 3.80 | 3.80 |
| Cheese Powder[1] | 1.20 | 1.20 |
| FORMULA NO. 7 | | |
| Second Clear Wheat Flour | 74.00 | 74.00 |
| Semolina | 5.00 | 5.00 |
| Vital Wheat Gluten | 2.50 | 2.50 |
| Myvaplex Surfactant | 0.50 | 0.50 |
| Food Grade Glycerine | 4.20 | 4.20 |
| Corn Syrup | 5.00 | 5.00 |
| Food Grade Phosphoric Acid | 0.80 | 0.80 |
| Salt | 0.30 | 0.30 |
| Morton's Lite Salt | 2.40 | 2.40 |
| Potassium Sorbate | 0.30 | 0.30 |
| Beef Tallow[1] | 3.80 | 3.80 |
| Cheese Powder[1] | 1.20 | 1.20 |
| FORMULA NO. 8 | | |
| Second Clear Wheat Flour | 73.50 | 73.50 |
| Semolina | 5.00 | 5.00 |
| Vital Wheat Gluten | 2.50 | 2.50 |
| Myvaplex Surfactant | 0.50 | 0.50 |
| Food Grade Glycerine | 4.20 | 4.20 |
| Baker's Sugar | 5.00 | 5.00 |
| Food Grade Phosphoric Acid | 0.80 | 0.80 |
| Salt | 0.30 | 0.30 |
| Morton's Lite Salt | 2.40 | 2.40 |
| Potassium Sorbate | 0.30 | 0.30 |
| Tomato Powder | 0.50 | 0.50 |
| Beef Tallow[1] | 3.80 | 3.80 |
| Cheese Powder[1] | 1.20 | 1.20 |
| FORMULA NO. 9 | | |
| Second Clear Wheat Flour | 77.90 | 69.80 |
| Food Grade Glycerine | 4.69 | 4.20 |
| Baker's Sugar | 5.58 | 5.00 |
| Food Grade Phosphoric Acid | 0.89 | 0.80 |
| Salt | 0.33 | 0.30 |
| Potassium Sorbate | 0.33 | 0.30 |
| HF Nutrisoy | 5.58 | 5.00 |
| Beef Tallow[1] | 3.35 | 3.00 |
| Cheese Powder[1] | 1.34 | 1.20 |
| FORMULA NO. 10 | | |
| Second Clear Wheat Flour | 69.80 | 69.80 |
| Semolina | 5.00 | 5.00 |
| Vital Wheat Gluten | 2.50 | 2.50 |
| Myvaplex Surfactant | 0.50 | 0.50 |
| Food Grade Glycerine | 4.20 | 4.20 |
| Baker's Sugar | 5.00 | 5.00 |
| Food Grade Phosphoric Acid | 0.80 | 0.80 |
| Salt | 0.30 | 0.30 |
| Morton's Lite Salt | 2.40 | 2.40 |
| Potassium Sorbate | 0.30 | 0.30 |
| Taste NS 220T | 5.00 | 5.00 |
| Beef Tallow[1] | 3.00 | 3.00 |
| Cheese Powder[1] | 1.20 | 1.20 |

[1]These ingredients were applied to the products after extrusion and did not form a part of the extruded mixtures.

In each case, a dry formula as specified above was fed to a Wenger Model MDL 1 DC preconditioner, Configuration No. 144 (also referred to as a mixing cylinder) where steam and water were injected into the dry ingredients during agitation. This pretreatment served to moisturize and partially cook the raw ingredients.

After preconditioning, the mixture was fed to the inlet of a Wenger Model TX-52 twin screw extruder having a total of 9 heads (inlet head, Wenger Part No. 55316-001; heads 2-5 and 7-8, Wenger Part No. 55307-001; head 6, Wenger Part No. 55343-003; and head 9, Wenger Part No. 55319-001), with the 6th head being vented. The screws were each made up of interconnected Wenger screw components from the inlet to the outlet end of the screws, namely: Wenger Parts Nos. 55326-103, 55325-003, 55325-003, 55325-003, 55325-101, 55324-101R, 55324-103R, 55324-105R, 55325-003, 55325-003, 55324-101R 55324-103R, 55324-105R, 55325-003, 55325-003, 55324-101R, 55324-103R, 55324-105R, 55325-003, 55325-003, 55325-003, 55325-003, 55325-003, 55325-003, and 55321-005. A die spacer (Wenger Part No. 55398-001) was used between the end of the barrel and the die plate, with the latter having openings designed to yield a ziti product. The die plate was manufactured by Moldari Brothers of Brooklyn, N.Y.

In the extruder, the mixture was subjected to increasing temperatures and pressures, until the 6th vented head was reached, whereupon moisture was vented. In the portion of the extruder downstream of the vent, the temperature was lower than immediately prior to the vent.

The extruder heads were externally jacketed, and heat exchange media, i.e., cold water (CW), or hot oil (HO) was circulated through the heads for temperature control purposes. In addition, water and steam were injected into the barrel at head 2 to increase the moisture content of the material being processed. As the cooked material emerged from the ziti die, it was severed to create short pasta-type pieces having a length of about $\frac{3}{8}$-$\frac{1}{2}''$. The extruded product was then subjected to a drying/cooling sequence to complete the process.

The preconditioning, extrusion and drying/cooling conditions recorded during these runs are set forth below, where PPM refers to pounds per minute, PPH refers to pounds per hour and MCWB refers to moisture content, wet basis.

TABLE 2

| Raw Material Moisture | MCWB/% by wt. | RUN #1 | RUN #2 | RUN #3 | RUN #4 | RUN #5 |
|---|---|---|---|---|---|---|
| Raw Material Rate | PPH | 150 | 150 | 150 | 150 | 150 |
| Feed Screw Speed | RPM | 13 | 13 | 13 | 14 | 15 |
| Mixing Cylinder Speed | RPM | 110 | 110 | 110 | 110 | 110 |
| Steam Flow to Preconditioner | PPM | 0.935 | 0.935 | 0.928 | 0.865 | 0.858 |
| Water Flow to Preconditioner | PPM | 0.353 | 0.353 | 0.353 | 0.353 | 0.353 |
| Preconditioner Temperature | °F. | 210 | 210 | 210 | 210 | 210 |
| Moisture Entering Extruder | MCWB/% by wt. | 29.25 | 23.21 | 27.55 | 27.61 | 26.42 |
| EXTRUSION INFORMATION: | | | | | | |
| Extruder Shaft Speed | RPM | 160 | 160 | 160 | 160 | 160 |
| Motor Load | % | 23 | 25 | 26 | 26 | 31 |
| Steam Flow to Extruder | PPM | 0.323 | 0.209 | 0.352 | 0.268 | 0.301 |
| Water Flow to Extruder | PPM | 0.015 | 0.015 | 0.137 | 0.049 | 0.049 |
| Moisture in the Extruder | MCWB/% | — | — | — | — | — |

TABLE 2-continued

| | | | | | | |
|---|---|---|---|---|---|---|
| Control/Temperature-2nd Head | °F. | CW/136 | CW/136 | CW/147 | CW/138 | CW/147 |
| Control/Temperature-3rd Head | °F. | CW/136 | CW/136 | CW/147 | CW/138 | CW/147 |
| Control/Temperature-4th Head | °F. | HO/230 | HO/230 | HO/230 | HO/230 | HO/230 |
| Control/Temperature-5th Head | °F. | HO/230 | HO/230 | HO/230 | HO/230 | HO/230 |
| Control/Temperature-6th Head | °F. | HO/230 | HO/230 | HO/230 | HO/230 | HO/230 |
| Control/Temperature-7th Head | °F. | CW/174 | CW/158 | CW/185 | CW/176 | CW/176 |
| Control/Temperature-8th Head | °F. | CW/174 | CW/158 | CW/185 | CW/176 | CW/176 |
| Control/Temperature-9th Head | °F. | CW/174 | CW/158 | CW/185 | CW/176 | CW/176 |
| Temperature, Die | °F. | 181 | 174 | 172 | 178 | 174 |
| Head/Pressure, 7th Head | PSIG | 0 | 0 | 100 | 50 | 50 |
| Head/Pressure, 8th Head | PSIG | 350 | 400 | 400 | 500 | 600 |
| Head/Pressure, 9th Head | PSIG | 650 | 800 | 700 | 1000 | 1200 |
| Die/Pressure | PSIG | 300 | 320 | 360 | 400 | 470 |
| Extrudate Rate (Wet) | — | — | — | — | — | — |
| Extrudate Moisture | MCWB/% by wt. | 34.32 | 34.04 | — | 31.95 | 31.39 |
| DRYING CONDITIONS: | | | | | | |
| Temperature Setting-Zone 1 | °F. | 100 | 80 | 80 | 80 | 80 |
| Retention Time-First Pass | Min. | 5.0 | 5.0 | 5.0 | 5.0 | 5.0 |
| Retention Time-Second Pass | Min. | 7.0 | 7.0 | 7.0 | 7.0 | 7.0 |
| Retention Time-Third Pass | Min. | 3.5 | 3.5 | 3.5 | 3.5 | 3.5 |
| FINAL PRODUCT INFORMATION: | | | | | | |
| Extrudate Moisture | MCWB/% by wt. | 26.23 | 26.82 | 21.64 | 26.06 | 24.74 |
| Formula Number | | 5 | 9 | 10 | 6 | 7 |

| | MCWB/% by wt. | RUN #6 | RUN #7 | RUN #8 | RUN #9 | RUN #10 |
|---|---|---|---|---|---|---|
| Raw Material Moisture | | | | | | |
| Raw Material Rate | PPH | 150 | 150 | — | 180 | 180 |
| Feed Screw Speed | RPM | 14 | 15 | 0 | 18 | 18 |
| Mixing Cylinder Speed | RPM | 110 | 111 | 0 | 112 | 112 |
| Steam Flow to Preconditioner | PPM | 0.832 | 0.807 | 0.000 | 0.917 | 0.917 |
| Water Flow to Preconditioner | PPM | 0.353 | 0.353 | 0.000 | 0.353 | 0.353 |
| Preconditioner Temperature | °F. | 210 | 210 | — | 210 | 210 |
| Moisture Entering Extruder | MCWB/% by wt. | 26.34 | 23.20 | 31.00 | 31.50 | 32.30 |
| EXTRUSION INFORMATION: | | | | | | |
| Extruder Shaft Speed | RPM | 160 | 170 | 0 | 175 | 175 |
| Motor Load | % | 32 | 25 | — | 23 | 23 |
| Steam Flow to Extruder | PPM | 0.282 | 0.436 | — | 0.308 | 0.293 |
| Water Flow to Extruder | PPM | 0.049 | 0.304 | — | 0.000 | 0.000 |
| Moisture in the Extruder | MCWB/% by wt. | — | — | — | 37.17 | — |
| Control/Temperature-2nd Head | °F. | CW/145 | 122 | — | CW/135 | CW/149 |
| Control/Temperature-3rd Head | °F. | CW/145 | 122 | — | CW/135 | CW/149 |
| Control/Temperature-4th Head | °F. | HO/230 | 230 | — | CW/230 | HO/230 |
| Control/Temperature-5th Head | °F. | HO/230 | 230 | — | HO/230 | HO/230 |
| Control/Temperature-6th Head | °F. | HO/230 | 230 | — | HO/230 | HO/230 |
| Control/Temperature-7th Head | °F. | CW/176 | 176 | — | HO/176 | CW/176 |
| Control/Temperature-8th Head | °F. | CW/176 | 176 | — | CW/176 | CW/176 |
| Control/Temperature-9th Head | °F. | CW/176 | 176 | — | CW/176 | CW/176 |
| Temperature, Die | °F. | 176 | — | — | 178 | 178 |
| Head/Pressure, 7th Head | PSIG | 50 | — | — | 300 | 300 |
| Head/Pressure, 8th Head | PSIG | 550 | 300 | — | 400 | 400 |
| Head/Pressure, 9th Head | PSIG | 1100 | 700 | — | 900 | 1000 |
| Die/Pressure | PSIG | 500 | 420 | — | 510 | 570 |
| Extrudate Rate (Wet) | — | — | — | — | 220.75 | — |
| Extrudate Moisture | MCWB/% by wt. | 36.11 | 35.50 | 41.00 | 36.40 | 36.20 |
| DRYING CONDITIONS: | | | | | | |
| Temperature Setting-Zone 1 | °F. | 80 | 170 | 170 | 170 | 170 |
| Retention Time-First Pass | Min. | 5.0 | 20.0 | 20.0 | 20.0 | 20.0 |
| Retention Time-Second Pass | Min. | 7.0 | 20.0 | 20.0 | 20.0 | 20.0 |
| Retention Time-Third Pass | Min. | 3.5 | 10.0 | 10.0 | 10.0 | 10.0 |
| FINAL PRODUCT INFORMATION: | | | | | | |
| Extrudate Moisture | MCWB/% by wt. | 30.56 | — | — | — | — |
| Formula Number | | 8 | 1 | 2 | 3 | 4 |

The final products of these runs were all soft, moist, shelf-stable, pasta-type products admirably suited for use in pet foods.

EXAMPLE 2

In this series of tests, a dry, pasta-type formula was first prepared, and then moisturized and extruded. The dry formula is set forth below:

TABLE 3

| Ingredient | Pounds | % By Weight |
|---|---|---|
| Second Clear Wheat Flour | 222 | 77.57 |
| Semolina | 15 | 5.24 |
| Vital Wheat Gluten | 7.05 | 2.62 |
| Myvaplex Surfactant | 1.50 | 0.52 |
| Food Grade Glycerine | 12.60 | 4.40 |
| Corn Syrup | 15 | 5.24 |

TABLE 3-continued

| Ingredient | Pounds | % By Weight |
|---|---|---|
| Food Grade Phosphoric Acid | 2.40 | 0.84 |
| Salt | 4.50 | 1.57 |
| KCl | 3.60 | 1.26 |
| Tomato Solids | 1.20 | 0.42 |
| Potassium Sorbate | 0.90 | 0.31 |

The dry formula was fed to the same preconditioner-/extruder apparatus described in Example 1 in order to precondition, heat and essentially completely gelatinize the formula to produce a ziti pasta-type product, which was cut as it emerged from the extruder. Thereafter, the product was partially dried to produce a soft, moist, resilient product. The following data was collected during these runs.

TABLE 5

| Ingredient | Pounds | % By Weight |
|---|---|---|
| Second Clear Wheat Flour | 220.05 | 73.35 |
| Fructose | 30.00 | 10.00 |
| Semolina | 15.00 | 5.00 |
| Vital Wheat Gluten | 7.50 | 2.50 |
| Myvaplex Surfactant | 1.50 | 0.50 |
| Food Grade Glycerine | 13.20 | 4.40 |
| Food Grade Phosphoric Acid | 2.55 | 0.85 |
| Salt | 4.50 | 1.50 |
| Potassium Chloride | 3.60 | 1.20 |
| Tomato Solids | 1.20 | 0.40 |
| Potassium Sorbate | 0.90 | 0.30 |

The formula was preconditioned, extruded and dried using the exact same equipment described in Examples 1 and 2, wherein the 6th head of the extruder was vented.

The results from this test series are set forth below.

TABLE 4

| | | RUN #11 | RUN #12 | RUN #13 | RUN #14 | RUN #15 | RUN #16 |
|---|---|---|---|---|---|---|---|
| Raw Material Rate | PPH | 165.0 | 165.0 | 165.0 | 165.0 | 165.0 | 165.0 |
| Feed Screw Speed | RPM | 15 | 15 | 15 | 15 | 15 | 15 |
| Mixing Cylinder Speed | RPM | 110 | 110 | 110 | 110 | 110 | 110 |
| Steam Flow to Preconditioner | PPM | 0.917 | 0.917 | 0.935 | 0.935 | 0.935 | 0.920 |
| Water Flow to Preconditioner | PPM | 0.364 | 0.364 | 0.364 | 0.364 | 0.364 | 0.364 |
| Preconditioner Temperature | °F. | 210 | 210 | 210 | 210 | 210 | 210 |
| Moisture Entering Extruder | MCWB/% by wt. | 28.27 | 28.80 | — | — | — | — |
| EXTRUSION INFORMATION: | | | | | | | |
| Extruder Shaft Speed | RPM | 162 | 162 | 161 | 161 | 161 | 161 |
| Motor Load | % | 23 | 23 | 23 | 28 | 23 | 24 |
| Steam Flow to Extruder | PPM | 0.370 | 0.143 | 0.250 | 0.250 | 0.238 | 0.249 |
| Water Flow to Extruder | PPM | .062 | .049 | .049 | .049 | .049 | .049 |
| Control/Temperature-2nd Head | °F. | CW/122 | CW/127 | CW/124 | CW/124 | CW/124 | CW/124 |
| Control/Temperature-3rd Head | °F. | CW/122 | CW/127 | CW/124 | CW/124 | CW/124 | CW/124 |
| Control/Temperature-4th Head | °F. | HO/230 | HO/230 | HO/230 | HO/230 | HO/230 | HO/230 |
| Control/Temperature-5th Head | °F. | HO/230 | HO/230 | HO/230 | HO/230 | HO/230 | HO/230 |
| Control/Temperature-6th Head | °F. | HO/230 | HO/230 | HO/230 | HO/230 | HO/230 | HO/230 |
| Control/Temperature-7th Head | °F. | CW/194 | CW/158 | CW/176 | CW/176 | CW/176 | CW/176 |
| control/Temperature-8th Head | °F. | CW/194 | CW/158 | CW/176 | CW/176 | CW/176 | CW/176 |
| Control/Temperature-9th Head | °F. | CW/194 | CW/158 | CW/176 | CW/176 | CW/176 | CW/176 |
| Temperature, Die | °F. | 181 | 178 | 178 | 174 | 178 | 185 |
| Head/Pressure, 7th Head | PSIG | 100 | — | — | — | 100 | — |
| Head/Pressure, 8th Head | PSIG | 400 | 330 | 500 | 500 | 450 | 500 |
| Head/Pressure, 9th Head | PSIG | 700 | 723 | 900 | 1000 | 800 | 850 |
| Die/Pressure | PSIG | 320 | 280 | 325 | 370 | 320 | 250 |
| Extrudate Moisture | MCWB/% by wt. | 33.29 | 32.21 | — | 28.12 | 30.13 | — |
| DRYING CONDITIONS: | | | | | | | |
| Temperature Setting-Zone 1 | °F. | 77 | 77 | 90 | 93 | 80 | 78 |
| Retention Time-First Pass | Min. | 7.1 | 7.1 | 7.1 | 7.1 | 7.1 | 7.1 |
| Retention Time-Second Pass | Min. | 13.3 | 13.3 | 13.3 | 13.3 | 13.3 | 13.3 |
| Retention Time-Cooler | Min. | 6.7 | 6.7 | 6.7 | 6.7 | 6.7 | 6.7 |
| FINAL PRODUCT INFORMATION: | | | | | | | |
| Extrudate Moisture | MCWB/% by wt. | 23.68 | 25.57 | 19.51 | 18.66 | 29.72 | 30.07 |

EXAMPLE 3

A further series of test runs was conducted, making use of a dry formula consisting of the following.

TABLE 6

| | | RUN #17 | RUN #18 | RUN #19 | RUN #20 | RUN #21 | RUN #22 |
|---|---|---|---|---|---|---|---|
| Feed Screw Speed | RPM | 15 | 17 | 20 | 20 | 20 | 20 |
| Mixing Cylinder Speed | RPM | 110 | 110 | 110 | 110 | 110 | 110 |
| Steam Flow to Preconditioner | PPM | 0.843 | 0.843 | 0.843 | 0.843 | 0.843 | 0.843 |
| Water Flow to Preconditioner | PPM | 0.353 | 0.353 | 0.353 | 0.353 | 0.353 | 0.353 |
| Preconditioner Temperature | °F. | 210 | 210 | 210 | 210 | 210 | 210 |
| Moisture Entering Extruder | MCWB/% by wt. | — | 25.04 | 24.87 | — | — | — |
| EXTRUSION INFORMATION: | | | | | | | |
| Extruder Shaft Speed | RPM | 159 | 170 | 177 | 177 | 179 | 179 |
| Motor Load | % | 20 | 21 | 25 | 23 | 22 | 25 |
| Steam Flow to Extruder | PPM | 0.227 | 0.220 | 0.220 | — | 0.224 | 0.224 |
| Water Flow to Extruder | PPM | .137 | .137 | .137 | .137 | .137 | .137 |

TABLE 6-continued

|  |  | RUN #17 | RUN #18 | RUN #19 | RUN #20 | RUN #21 | RUN #22 |
|---|---|---|---|---|---|---|---|
| Control/Temperature-2nd Head | °F. | CW/122 | CW/126 | CW/149 | CW/149 | CW/145 | CW/145 |
| Control/Temperature-3rd Head | °F. | CW/122 | CW/126 | CW/149 | CW/149 | CW/145 | CW/145 |
| Control/Temperature-4th Head | °F. | HO/212 | HO/212 | HO/212 | HO/212 | HO/212 | HO/212 |
| Control/Temperature-5th Head | °F. | HO/212 | HO/212 | HO/212 | HO/212 | HO/212 | HO/212 |
| Control/Temperature-6th Head | °F. | HO/212 | HO/212 | HO/212 | HO/212 | HO/212 | HO/212 |
| Control/Temperature-7th Head | °F. | CW/196 | CW/194 | CW/176 | CW/176 | CW/176 | CW/176 |
| Control/Temperature-8th Head | °F. | CW/196 | CW/194 | CW/176 | CW/176 | CW/176 | CW/176 |
| Control/Temperature-9th Head | °F. | CW/194 | CW/194 | CW/176 | CW/176 | CW/176 | CW/176 |
| Temperature, Die | °F. | 178 | 183 | 189 | 189 | 189 | 185 |
| Head/Pressure, 7th Head | PSIG | — | 50 | 300 | 300 | 300 | 200 |
| Head/Pressure, 8th Head | PSIG | 350 | 400 | 450 | 450 | 400 | 450 |
| Head/Pressure, 9th Head | PSIG | 550 | 700 | 280 | 750 | 700 | 800 |
| Die/Pressure | PSIG | 220 | 260 | 280 | 260 | 260 | 270 |
| Extrudate Moisture | MCWB/% by wt. | — | 27.49 | 24.71 | 26.44 | 25.32 | 24.18 |
| DRYING CONDITIONS: |  |  |  |  |  |  |  |
| Temperature Setting-Zone 1 | °F. | 125 | 125 | 125 | 125 | 125 | 125 |
| Retention Time-First Pass | Min. | 5.6 | 5.6 | 5.6 | 5.6 | 5.6 | 5.6 |
| Retention Time-Second Pass | Min. | 7.1 | 7.1 | 7.1 | 7.1 | 7.1 | 7.1 |
| Retention Time-Cooler | Min. | 3.6 | 3.6 | 3.6 | 3.6 | 3.6 | 3.6 |
| FINAL PRODUCT INFORMATION: |  |  |  |  |  |  |  |
| Extrudate Moisture | MCWB/% by wt. | 21.50 | 18.70 | 19.00 | 19.10 | 18.80 | 18.30 |

EXAMPLE 3

A series of soft, moist, pasta-type confection products suitable for human consumption were prepared using equipment identical to that described in Example 1. The dry formulas employed in these runs are set forth below:

TABLE 7

| Ingredient | Pounds | % By Weight |
|---|---|---|
| FORMULA NO. 1 |  |  |
| HRRW-Wisdom[1] | 70.00 | 69.95 |
| Sugar (Confectioners) | 20.00 | 19.99 |
| Glycerine | 5.00 | 5.00 |
| Light Salt | 1.00 | 1.00 |
| Citric Acid | 2.00 | 2.00 |
| Myvaplex 600 | 0.75 | 0.75 |
| Phosphoric Acid (75%) | 0.40 | 0.40 |
| Potassium Sorbate | 0.30 | 0.30 |
| #6 Yellow Color | 0.02 | 0.01 |
| Natural Lemonade Flavor-WONF 264292[2] | 0.60 | 0.60 |
| FORMULA NO. 2 |  |  |
| HRRW-Wisdom | 70.00 | 70.11 |
| Sugar (Confectioners) | 20.00 | 20.03 |
| Glycerine | 5.00 | 5.01 |
| Light Salt | 1.00 | 1.00 |
| Citric Acid | 2.00 | 2.00 |

TABLE 7-continued

| Ingredient | Pounds | % By Weight |
|---|---|---|
| Myvaplex 600 | 0.75 | 0.75 |
| Phosphoric Acid (75%) | 0.40 | 0.40 |
| Potassium Sorbate | 0.30 | 0.30 |
| Raspberry Flavor[2,3] | 0.38 | 0.38 |
| #40 Red Coloring | 0.03 | 0.03 |

[1] Hard red winter wheat
[2] The flavorings used were pumped into the extruder down-stream of the vent in order to minimize loss of the flavoring by vaporization
[3] Artificial raspberry concentrate (Beckflavor-C-6327) diluted to form a 6.25% solution.

The ingredients of the respective formulas (except the flavoring components and citric acid) were mixed and fed to the preconditioner/extruder apparatus in order to precondition, heat and gelatinize the formula to produce the final pasta-type confectionery products. After the extruded products were formed, they were sprayed with a mixture of citric acid and water, in order to lower the surface pH and thereby retard spoilage thereof. Products made using formula 1 had a ziti configuration, whereas the product made using formula 2 had a rotini shape.

The following data was collected during these runs.

TABLE 8

|  |  | RUN #23 | RUN #24 |
|---|---|---|---|
| Feed Screw Speed | RPM | 12 | 14 |
| Mixing Cylinder Speed | RPM | 110 | 110 |
| Steam Flow to Preconditioner | PPM | 0.693 | 0.935 |
| Water Flow to Preconditioner | PPM | 0.353 | 0.353 |
| Preconditioner Temperature | °F. | 210 | 210 |
| Moisture Entering Extruder | MCWB/% by wt. | — | 21.60 |
| EXTRUSION INFORMATION: |  |  |  |
| Extruder Shaft Speed | RPM | 190 | 177 |
| Motor Load | % | 26 | 35 |
| Steam Flow to Extruder | PPM | 0.231 | 0.246 |
| Water Flow to Extruder | PPM | 0.049 | 0.0 |
| Control/Temperature-2nd Head | °F. | CW/135 | CW/133 |
| Control/Temperature-3rd Head | °F. | CW/135 | CW/133 |
| Control/Temperature-4th Head | °F. | HO/230 | HO/230 |
| Control/Temperature-5th Head | °F. | HO/230 | HO/230 |
| Control/Temperature-6th Head | °F. | HO/230 | HO/230 |
| Control/Temperature-7th Head | °F. | CW/194 | CW/194 |
| Control/Temperature-8th Head | °F. | CW/194 | CW/194 |

TABLE 8-continued

|  |  | RUN #23 | RUN #24 |
|---|---|---|---|
| Control/Temperature-9th Head | °F. | CW/194 | CW/194 |
| Temperature, Die | °F. | 183 | 172 |
| Head/Pressure, 7th Head | PSIG | — | 400 |
| Head/Pressure, 8th Head | PSIG | 400 | 600 |
| Head/Pressure, 9th Head | PSIG | 800 | 1100 |
| Die/Pressure | PSIG | 300 | 250 |
| Extrudate Moisture | MCWB/% by wt. | — | 22.26 |
| DRYING CONDITIONS: |  |  |  |
| Temperature Setting-Zone 1 | °F. | 75 | 75 |
| Retention Time-First Pass | Min. | 7.4 | 7.4 |
| Retention Time-Second Pass | Min. | 7.0 | 7.0 |
| Retetnion Time-Cooler | Min. | 3.0 | 3.0 |
| FINAL PRODUCT INFORMATION: |  |  |  |
| Extrudate Moisture | MCWB/% by wt. | — | 22.26 |

In run #23, the lemonade flavor was diluted to a 16% solution and injected into the extruder downstream of the vent at a rate of 0.1 lb/min. In run #24, the raspberry flavor was similarly injected into the extruder at the same rate and at a level of 0.375% (concentrate percentage level). As indicated above, a dilute solution of citric acid was sprayed on the extrudates after drying thereof.

The final confectionery products were soft and moist and had a pleasing texture and flavor. They were in every way suited for direct human consumption.

EXAMPLE 4

In this series of runs, a number of pet food products were produced using a Wenger Model TX-52 extruder with preconditioner, having the configuration described in Example 1. The dry formulae used are set forth below:

TABLE 9

|  | Run #25 | Run #26 | Run #27 | Run #28 | Run #29 | Run #30 | Run #31 |
|---|---|---|---|---|---|---|---|
| 2nd Clear Flour | 73.75 | 70.30 | 68.75 | 70.65 | 72.75 | 72.25 | 69.75 |
| Fructose | 10.00 | 12.50 | 15.00 | 10.00 | 10.00 | 10.00 | 10.00 |
| Semolina | 5.00 | 5.00 | 5.00 | 5.00 | 5.00 | 5.00 | 5.00 |
| Glycerin | 4.40 | 5.00 | 4.40 | 7.50 | 4.40 | 4.40 | 4.40 |
| Vital Wheat Gluten | 2.50 | 2.50 | 2.50 | 2.50 | 2.50 | 2.50 | 2.50 |
| Salt | 1.50 | 1.60 | 1.50 | 2.50 | 1.50 | 1.50 | 1.50 |
| KCl | 1.20 | 1.40 | 1.20 | 1.20 | 1.20 | 1.20 | 1.20 |
| Phosphoric Acid | 0.85 | 0.90 | 0.85 | 0.85 | 0.85 | 0.85 | 0.85 |
| Potassium Sorbate | 0.30 | 0.30 | 0.30 | 0.30 | 0.30 | 0.30 | 0.30 |
| Myvaplex | 0.50 | 0.50 | 0.50 | 0.50 | 1.50 | — | 0.50 |
| UNL Additive[1] | — | — | — | — | — | 2.00 | — |
| Guar Gum | — | — | — | — | — | — | 4.00 |

The preconditioning, extrusion and drying/cooling conditions are set forth below:

TABLE 10

|  |  | RUN #25 | RUN #26 | RUN #27 | RUN #28 | RUN #29 | RUN #30 | RUN #31 |
|---|---|---|---|---|---|---|---|---|
| RAW MATERIAL INFORMATION: |  |  |  |  |  |  |  |  |
| Raw Material Rate | PPH | 150 | 150 | 150 | 150 | 150 | 150 | 150 |
| Feed Screw Speed | RPM | 15 | 15 | 15 | 15 | 15 | 15 | 15 |
| Mixing Cylinder Speed | RPM | 110 | 110 | 110 | 110 | 110 | 110 | 110 |
| Steam Flow to Mixing Cylinder | PPM | 0.880 | 0.880 | 0.620 | 0.616 | 0.910 | 0.910 | 0.891 |
| Water Flow to Mixing Cylinder | PPM | 0.227 | 0.227 | 0.227 | 0.247 | 0.247 | 0.247 | 0.247 |
| Mixing Cylinder Temperaute | °F. | 210 | 210 | 210 | 185 | 210 | 210 | 210 |
| Moisture Entering Extruder | MCWB/% by wt. | 29.37 | 27.36 | 25.22 | 29.84 | 27.83 | 26.41 | — |
| EXTRUSION INFORMATION: |  |  |  |  |  |  |  |  |
| Extruder Shaft Speed | RPM | 169 | 169 | 169 | 170 | 170 | 180 | 168 |
| Motor Load | % | 19 | 17 | 17 | 17 | 15 | 16 | 21 |
| Steam Flow to Extruder | PPM | 0.301 | 0.301 | 0.110 | 0.132 | 0.380 | 0.380 | 0.385 |
| Control/Temperature-2nd Head | °F. | CW/122 | CW/122 | CW/122 | CW/122 | CW/122 | CW/122 | CW/153 |
| Control/Temeprature-3rd Head | °F. | CW/122 | CW/122 | CW/122 | CW/122 | CW/122 | CW/122 | CW/153 |
| Control/Temperature-4th Head | °F. | HO/212 | HO/212 | HO/212 | HO/212 | HO/212 | HO/212 | HO/212 |
| Control/Temperature-5th Head | °F. | HO/212 | HO/212 | HO/212 | HO/212 | HO/212 | HO/212 | HO/212 |
| Control/Temeprature-6th Head | °F. | HO/212 | HO/212 | HO/212 | HO/212 | HO/212 | HO/212 | HO/212 |
| Control/Temperature-7th Head | °F. | CW/194 | CW/194 | CW/198 | CW/196 | CW/196 | CW/196 | CW/194 |
| Control/Temperature-8th Head | °F. | CW/194 | CW/194 | CW/198 | CW/194 | CW/194 | CW/194 | CW/194 |
| Control/Temeprature-9th Head | °F. | CW/194 | CW/194 | CW/194 | CW/194 | CW/194 | CW/194 | CW/194 |
| Temperature, Die | °F. | 169 | 169 | 171 | — | 171 | 169 | — |
| Head/Pressure, 8th Head | PSIG | 450 | 350 | 350 | 400 | 300 | 300 | 500 |
| Head/Pressure, 9th Head | PSIG | 650 | 550 | 550 | 500 | 500 | 500 | — |
| Die/Pressure | PSIG | 240 | 210 | 210 | 400 | 180 | 180 | — |
| Extrudate Moisture | MCWB/% bt wt. | 28.47 | 26.59 | 23.46 | 24.71 | 25.57 | 19.96 | 24.77 |
| DRYING CONDITIONS: |  |  |  |  |  |  |  |  |
| Temperature Setting-Zone 1 | °F. | 125 | 125 | 125 | 125 | 125 | 125 | 125 |
| Retention Time-First Pass | Min. | 5.0 | 5.0 | 5.0 | 5.0 | 5.0 | 5.0 | 5.0 |
| Retention Time-Second Pass | Min. | 5.0 | 5.0 | 5.0 | 5.0 | 5.0 | 5.0 | 5.0 |
| Retention Time-Cooler | Min. | 2.5 | 2.5 | 2.5 | 2.5 | 2.5 | 2.5 | 2.5 |
| FINAL PRODUCT INFORMATION: |  |  |  |  |  |  |  |  |

TABLE 10-continued

|  | | RUN #25 | RUN #26 | RUN #27 | RUN #28 | RUN #29 | RUN #30 | RUN #31 |
|---|---|---|---|---|---|---|---|---|
| Extrudate Moisture | MCWB/% by wt. | 14.57 | 15.72 | 15.11 | 14.12 | 14.14 | 18.24 | 13.38 |

Certain of the products described above were tested using an Instron Universal Testing Machine set up to perform a double compression on each sample using a 102 kg load cell. A single noodle of the extrudates was placed into an aluminum ring and then compressed to 50% by the original average height. The compression head on the Instron was 48.0 mm in diameter. Testing was done over a 10 hour period. At the beginning, the extrudates were spread evenly over ventilated trays. These trays were put on crates to insure even air flow during drying, and every hour the samples were stirred. The samples from each run tested were randomly drawn each hour and tested on the Instron in triplicate. Room temperature and relative humidity were constant at 21° C and 39%, respectively. Moisture analyses were performed in triplicate according to AOAC 926.07. Samples were randomly drawn and ground for moisture determinations every hour for a total of ten hours. Over the ten-hour period, the moisture contents of four samples ranged as follows: Run 25, 20.45–13.68%; Run 26, 20.98–14.62%; Run 28, 20.59–14.71%; and Run 30, 23.99–18.00%.

The following table is a summary of the moisture content data and Instron data. There were five parameters calculated from the raw data collected, namely hardness, cohesiveness, elasticity/springiness and chewiness. Hardness is defined as the force necessary to obtain the indicated deformation. Cohesiveness is a measure of the strength of internal bonds making up the body of the product. Elasticity/springiness is the rate at which the formed extrudate goes back to its undeformed condition after the deforming force is removed. Chewiness is the total energy required to masticate a sample, and is related to hardness, cohesiveness and elasticity.

As the moisture content decreases in the samples, there is a slight decrease in cohesiveness, elasticity and springiness. The hardness parameter exhibits the greatest amount of change.

TABLE 11

| Hr. | Moisture (%) | Hardness (kg) | Cohesiveness (cm²) | Elasticity (kg) | Chewiness (texture units) | Springiness (cm) |
|---|---|---|---|---|---|---|
| | | | RUN #25 | | | |
| 1 | 20.4491 | 15.080 | 0.605 | 0.666 | 5.998 | 0.813 |
| 2 | 18.3631 | 17.527 | 0.507 | 0.670 | 6.062 | 0.766 |
| 3 | 17.4267 | 24.683 | 0.521 | 0.643 | 8.252 | 0.821 |
| 4 | 16.7950 | 32.033 | 0.506 | 0.663 | 6.892 | 0.782 |
| 5 | 15.8474 | 28.080 | 0.504 | 0.658 | 9.277 | 0.766 |
| 6 | 15.2643 | 34.063 | 0.412 | 0.596 | 8.380 | 0.677 |
| 7 | 14.3799 | 43.443 | 0.460 | 0.637 | 13.277 | 0.718 |
| 8 | 13.7766 | 44.027 | 0.370 | 0.578 | 9.266 | 0.642 |
| 9 | 13.8727 | 41.387 | 0.40 | 0.607 | 10.145 | 0.671 |
| 10 | 13.6788 | 37.510 | 0.487 | 0.705 | 13.049 | 0.691 |
| | | | RUN #26 | | | |
| 1 | 20.9767 | 12.313 | 0.642 | 0.770 | 6.140 | 0.837 |
| 2 | 20.0348 | 11.923 | 0.602 | 0.744 | 5.348 | 0.808 |
| 3 | 18.9198 | 14.800 | 0.632 | 0.706 | 6.627 | 0.859 |
| 4 | 18.1737 | 16.783 | 0.672 | 0.771 | 8.691 | 0.864 |
| 5 | 17.2748 | 19.760 | 0.579 | 0.742 | 8.455 | 0.789 |
| 6 | 16.3474 | 26.450 | 0.577 | 0.752 | 11.504 | 0.770 |
| 7 | 15.7711 | 31.647 | 0.547 | 0.730 | 12.679 | 0.749 |
| 8 | 15.3864 | 33.197 | 0.512 | 0.727 | 12.743 | 0.699 |
| 9 | 15.2095 | 35.713 | 0.472 | 0.695 | 11.725 | 0.674 |
| 10 | 14.6244 | 36.470 | 0.374 | 0.626 | 8.455 | 0.590 |
| | | | RUN #28 | | | |
| 1 | 20.5910 | 10.201 | 0.553 | 0.708 | 3.924 | 0.776 |
| 2 | 19.5625 | 12.830 | 0.619 | 0.728 | 5.462 | 0.840 |
| 3 | 18.8149 | 14.633 | 0.584 | 0.700 | 6.115 | 0.839 |
| 4 | 18.0760 | 14.577 | 0.599 | 0.739 | 6.404 | 0.831 |
| 5 | 17.1309 | 21.750 | 0.566 | 0.740 | 9.107 | 0.766 |
| 6 | 16.8106 | 21.197 | 0.604 | 0.775 | 9.752 | 0.782 |
| 7 | 16.0480 | 23.953 | 0.513 | 0.761 | 9.472 | 0.680 |
| 8 | 15.5138 | 26.093 | 0.521 | 0.748 | 10.276 | 0.702 |
| 9 | 14.9097 | 25.830 | 0.603 | 0.751 | 11.689 | 0.778 |
| 10 | 14.7065 | 30.230 | 0.497 | 0.723 | 10.833 | 0.688 |
| | | | RUN #30 | | | |
| 1 | 23.9873 | 19.283 | 0.666 | 0.770 | 9.829 | 0.872 |
| 2 | 22.9327 | 23.817 | 0.638 | 0.767 | 12.129 | 0.832 |
| 3 | 22.1909 | 23.957 | 0.595 | 0.755 | 10.549 | 0.794 |
| 4 | 21.5479 | 21.583 | 0.531 | 0.707 | 7.835 | 0.756 |
| 5 | 20.5651 | 26.727 | 0.586 | 0.742 | 11.776 | 0.795 |
| 6 | 20.1545 | 40.070 | 0.672 | 0.794 | 21.079 | 0.850 |
| 7 | 19.2969 | 31.340 | 0.649 | 0.773 | 15.693 | 0.842 |
| 8 | 18.6578 | 34.807 | 0.563 | 0.754 | 14.715 | 0.747 |
| 9 | 18.0400 | 40.823 | 0.600 | 0.773 | 18.849 | 0.783 |
| 10 | 18.0039 | 51.887 | 0.468 | 0.714 | 15.190 | 0.680 |

These results were compared with similar results recorded for an unacceptable product stored for more than one year. This product exhibited a moisture content of 12.89%, a hardness value of 41.23 kg, cohesiveness of 0.366 cm$^2$, elasticity of 0.22 kg, chewiness of 8.407 texture units and springiness of 0.667 cm.

We claim:

1. A soft, moist pasta-type food comprising a body extruded at a die temperature below 212° F., and having a substantially completely gelatinized matrix including therein from about 35–70% by weight starch on a dry basis, and respective quantities of protein and sugar, said body having a moisture content of from about 18–30% by weight and a water activity of from about 0.6–0.9, said body being manually deformable and having the property of resiliently returning to its original shape after such manual deformation, said body having a bacteriological shelf stability of at least about 9 months, said body being directly consumable without rehydration or cooking.

2. The pasta-type food of claim 1, said body being formed into a shape selected from the group consisting of tubular, ziti and rotini shapes.

3. The pasta-type food of claim 1, said matrix including a quantity of Semolina therein.

4. The pasta-type food of claim 1, said matrix including a surfactant therein.

5. The pasta-type food of claim 1, said matrix including a quantity of glycerin therein.

6. The pasta-type food of claim 1, said water activity being from about 0.7–0.85.

7. The pasta-type food of claim 1, said moisture content being from about 18–23% by weight.

8. The pasta-type food of claim 1, said matrix having at least about 65% by weight wheat flour therein, on a dry basis.

9. The pasta-type food of claim 1, said sugar being present at a level of at least about 35% by weight, on a dry basis.

10. The pasta-type food of claim 1, said protein being present at a level of from about 25% by weight, on a dry basis.

11. The pasta-type food of claim 1, said food being a confection suitable for human consumption.

12. The pasta-type food of claim 11, said sugar being present at a level of from about 18–25% by weight.

13. The pasta-type food of claim 1, said food being a pet food.

14. The pasta-type food of claim 13, said pet food having a protein content of from about 4–10% by weight, dry basis.

15. A method of producing a soft, moist pasta-type food comprising the steps of:

forming a mixture including therein from about 35–70% by weight starch on a dry basis, and respective quantities of protein and sugar; and adding water to said mixture to form a moisturized mixture, and passing said moisturized mixture through an extruder presenting an elongated barrel having an axially rotatable auger therein and an endmost extrusion die, subjecting said moisturized mixture during said extrusion to increasing levels of temperature and pressure for substantially completely gelatinizing the starch fraction of the moisturized mixture and extruding the moisturized mixture at a die temperature of less than 212° F., and forming a body having a moisture content of from about 18–30% by weight and a water activity of from about 0.6–0.9, said body being manually deformable and having the property of resiliently returning to its original shape after such manual deformation, said body having a bacteriological shelf stability of at least about 9 months, said body being directly consumable without rehydration or cooking.

16. The method of claim 15, said body being formed into a shape selected from the group consisting of tubular, ziti and rotini shapes.

17. The method of claim 15, said mixture including a quantity of Semolina therein.

18. The method of claim 15, said mixture including a surfactant therein.

19. The method of claim 15, said mixture including a quantity of glycerin therein.

20. The method of claim 15, said water activity being from about 0.7–0.85.

21. The method of claim 15, said moisture content being from about 18–23% by weight.

22. The method of claim 15, said mixture having at least about 65% by weight wheat flour therein, on a dry basis.

23. The method of claim 15, said sugar being present at a level of up to about 35% by weight, on a dry basis.

24. The method of claim 15, said protein being present at a level of up to about 25% by weight, on a dry basis.

25. The method of claim 15, including the step of first moisturizing said mixture in a preconditioner, and thereafter heating the moisturized mixture into said extruder barrel.

26. The method of claim 25, including the step of subjecting the moisturized mixture to a maximum temperature of from about 100°–212° F. in said preconditioner.

27. The method of claim 25, including the step of retaining said moisturized mixture in the preconditioner for a period of from about 0.5–6 minutes.

28. The method of claim 25, including the step of adding moisture as steam or water to said mixture in said preconditioner.

29. The method of claim 15, including the step of subjecting said moisturized mixture to a maximum temperature in the range of from about 160°–280° F. in said extruder.

30. The method of claim 15, including the step of subjecting said moisturized mixture to a maximum pressure of from about 300–2000 psi in said extruder.

31. The method of claim 15, including the step of venting gaseous products from said moisturized mixture during passage thereof through said extruder.

32. The method of claim 31, said venting step comprising the step of subjecting said moisturized mixture to a vacuum.

33. The method of claim 32, said vacuum being at a level of from about 5–20 in. Hg.

34. The method of claim 31, including the step of subjecting said moisturized mixture to the maximum temperature it will experience in said extruder just prior to said venting step.

35. The method of claim 15, the residence time of said moisturized mixture in said extruder being from about 0.5–2.5 minutes.

36. The method of claim 15, including the step of drying the extruded body subsequent to extrusion therein.

37. The method of claim 15, including the step of adding flavoring to said extruder during passage of said mixture therethrough.

38. The method of claim 15, including the step of applying citric acid to the surface of said body after extrusion thereof.

39. A pasta-type pet food product made in accordance with the method of claim 15.

* * * * *